US 6,710,919 B1

(12) United States Patent
Clausen

(10) Patent No.: US 6,710,919 B1
(45) Date of Patent: Mar. 23, 2004

(54) TRANSLUCENT SCREEN COMPRISING A LENS SYSTEM

(75) Inventor: Erik Clausen, Roskilde (DK)

(73) Assignee: Scan Vision Screen ApS, Roskilde (DK)

( * ) Notice: Subject to any disclaimer, the term of this patent is extended or adjusted under 35 U.S.C. 154(b) by 0 days.

(21) Appl. No.: 10/089,451

(22) PCT Filed: Sep. 29, 2000

(86) PCT No.: PCT/DK00/00541

§ 371 (c)(1),
(2), (4) Date: Sep. 4, 2002

(87) PCT Pub. No.: WO01/23957

PCT Pub. Date: Apr. 5, 2001

(30) Foreign Application Priority Data

Sep. 29, 1999 (DK) .......................... 1999 01387

(51) Int. Cl.[7] .............................................. G03B 21/60
(52) U.S. Cl. ........................................ 359/453; 359/457
(58) Field of Search ................................ 359/452, 453, 359/457

(56) References Cited

U.S. PATENT DOCUMENTS

| 3,712,707 A | * | 1/1973 | Henkes, Jr. ................. 359/453 |
| 4,309,073 A | | 1/1982 | Nishimura et al. ......... 359/455 |
| 4,361,382 A | | 11/1982 | Miyoshi et al. ............. 359/453 |
| 4,773,731 A | | 9/1988 | Goldenberg et al. ........ 359/457 |
| 5,477,380 A | | 12/1995 | Watanabe et al. ........... 359/457 |
| 5,675,435 A | * | 10/1997 | Ishii et al. .................. 359/452 |
| 5,751,478 A | * | 5/1998 | Yoshimura et al. ......... 359/453 |
| 6,400,504 B2 | * | 6/2002 | Miyata ....................... 359/453 |

FOREIGN PATENT DOCUMENTS

| EP | 0732615 | 9/1996 |
| EP | 0859270 | 8/1998 |
| JP | 63-162224 | 7/1988 |
| JP | 1029336 | 11/1998 |
| JP | 11072849 | 3/1999 |
| WO | WO 99/53376 | 10/1999 |

* cited by examiner

Primary Examiner—Christopher Mahoney
(74) Attorney, Agent, or Firm—Finnegan, Henderson, Farabow, Garrett & Dunner, L.L.P.

(57) ABSTRACT

The invention relates to a translucent screen comprising a sheet element with a first surface and a second surface substantially parallel with the first surface, wherein the first surface comprises a number of lens facets that combine to form a lens system for paralleling diverging light beams that enter into the sheet element. The invention is characterised in that the lens facets contain a refractive agent in a concentration that exceeds the concentration of refractive agent in that part of the sheet element that is located outside the lens facets; and wherein the refractive index of the refractive agent deviates from the refractive index of the material in which the refractive agent is located.

20 Claims, 7 Drawing Sheets

TRANSLUCENT SCREEN COMPRISING A LENS SYSTEM

The present invention relates to a translucent screen comprising a lens system, in particular a screen with a Fresnel lens for use as or in connection with a projection screen, and preferably for use in a rear projection screen, and a projection screen with such Fresnel lens. The present invention also relates to methods of manufacturing a translucent screen according to the invention.

Projection screens with Fresnel lenses are used in various apparatuses for generating an image that is visible to the viewer; eg rear projection screens are used in connection with the display of radar images, in flight simulators, control rooms, television sets, video monitors, traffic control lights, microfilm readers, video-games and for the showing of films. In such apparatuses an image source arranged behind the screen projects light forwards along a projection axis towards the screen with a view to forming an image on the front of the screen that is visible to the viewer. Typically the screens are rectangular and may have many different dimensions, eg a screen for a microfilm reader will have a diagonal of about 38 cm (15 inches), whereas a screen for a control room or showing film can have a diagonal as large as about 450 cm (180 inches) or more.

A projection screen consists of two functional elements, partly a first element for converting the diverging light beams from the image source to parallel beams, partly a diffusion element that spreads the light from the first element in order to thereby make it visible for a viewer. In practice the first element consists of a substantially plane Fresnel lens structure and the second element of a plane plate with light-diffusing properties.

In principle such screen can be constructed in two ways, partly with a single plane sheet element that is, on the side facing towards the image source, provided with a Fresnel lens, and on the other side with a light-diffusing coating or structure, partly with two plane sheet elements arranged parallel in front of each other, wherein the sheet element most proximate to the image source is provided with a Fresnel lens on that side of the sheet that faces away from the image source, and wherein the sheet element that faces towards the viewer is provided with a light-diffusing coating or structure.

The drawback of the first principle is that a Fresnel lens that faces directly towards the light source has a relatively large transmission loss, typically of about 15 to 20 percent. This is due to the fact that a part of the light hits the step faces of the Fresnel lens and are therefor spread in an undesired direction; this phenomenon increases towards the periphery of the lens where the height of the step faces is increased which means that the loss of light is most comprehensive corresponding to the periphery of the screen. An advantage of this configuration is a more simple construction.

In the other principle where the Fresnel lens is arranged on that side of the sheet element that faces away from the image source, all light that moves into the plate hits the 'active' Fresnel facets where it is deflected to the: above-described parallel batch of beams. Albeit in principle this construction entails an increased efficiency of transmission, the separate light-diffusing plate, however, will cause a loss of transmission when the light is to pass two more border faces and therefore this type of screen has a transmission effect increase of no more than five to ten percent in all, a value that must in turn take into consideration the more complex construction thereof.

The drawback of both principles is the formation of image disturbances, such as rainbows or double- or multiple-image formation, also designated ghost images. Such phenomena are due to reflections that originate in the step faces at the lens that faces backwards and from the rear face of the Fresnel facets of the forwardly oriented lens, respectively. It applies to both principles that the disturbances are most expressed corresponding to the periphery of the lens where the facets are most steep and have the highest step faces. It also follows from this that the most comprehensive problems occur with lenses with short focal lengths since they are provided with the steepest facets.

The problem with internal reflections is well documented and various attempts have been made to counter them.

For instance, WO 99/53376 describes a projection-screen assembly comprising a layer with a Fresnel lens structure on the one side, wherein this layer consists of a matrix with refractive particles distributed therein. The particles are distributed throughout the entire thickness of the plate, and they serve on the one hand as image-generating diffusion means, and on the other hand to suppress disturbances created within the Fresnel construction elements as such, as also described above. This means that the same type of diffusion means is used for both functionalities, and likewise the positioning and properties of the image-generating parts are predetermined for the total screen structure.

The Fresnel layer is configured as an actual, self-supporting sheet that can be mounted either alone or in combination with other layers. Such plate will have a typical thickness of two to three mm. In case other layers are used the various layers can either be combined by gluing or mechanically. WO 99/53376 teaches various methods of manufacturing the Fresnel layer, eg extrusion of a plate with subsequent embossment of the Fresnel structure.

Also, EP-A-0 732 615 describes how a light-diffusing agent can be contained in a Fresnel lens that can, in turn, constitute one of several elements in a projection-screen assembly. This is also a case of the entire projection screen being constructed by combination of a number of layers, or screens.

U.S. Pat. No. 5,477,380 describes that reflections from the rear side of the facets can be attenuated by use of a lens basis containing a refractive diffusion material, but since, on the one hand, the refractive diffusion material is located in correspondence with that surface of the lens base plate that faces away from the lens facts, and on the other hand is very thick (in preferred embodiments the refractive material is distributed almost throughout the entire thickness of the base plate), a powerful diffusion of the incoming light beams will occur before they hit the back of the facets resulting in an unfocused and contrast-poor image. EP-A-0 859 270 discloses a corresponding solution in which the rear of the screen is coated with a relatively thick layer of a refractive diffusion material.

Japanese Patent Abstract 11 072 849 describes how the formation of rainbow phenomena can be reduced by use of a Fresnel lens, wherein the entire lens, ie both lens basis and lens facets, contain a refractive diffusion material. As mentioned above, this will lead to an unfocused as well as contrast-poor image. Also EP-A-0 859 270, U.S. Pat. No. 4,361,382 and Japanese Patent Abstract 10 293 361 teach screens wherein a refractive diffusion material is distributed corresponding to the entire thickness of the lens.

Accordingly it is an object of the invention to provide a screen comprising a surface with a number of lens facets that combine to form a lens system for paralleling diverging light beams (in particular a Fresnel lens structure) and that is suitable for use in or for acting as a projection screen, and wherein the problems with rainbows and double- or multiple-image formation has been reduced to a minimum while maintaining high definition and adequate contrast in image transmission.

It is a further object of the invention to provide an effective and simple method of manufacturing projection screens according to the invention.

The above and further objects of the invention that will appear from the description that follows of preferred embodiments of the invention are accomplished in that a translucent screen comprising a lens system according to the invention contains a refractive diffusion material distributed corresponding essentially to the lens facets as such, or corresponding to the lens facets as such and a layer immediately behind same. This principle has surprisingly been found to yield a much improved image transmission compared to the above-described solutions, wherein the light-diffusing agent is found either throughout the entire screen, the entire Fresnel screen or in that part of the screen that is most distant from the lens facets.

Typically, the translucent screen comprises a sheet element with a first surface and a second surface substantially parallel with the first surface, and wherein the first surface comprises a number of lens facts that combine to form a lens system for paralleling diverging light beams that enter into the sheet element from the first or the second surface. The second surface can be substantially planar or it can comprise a further lens system, eg a lenticular lens system.

According to a first, preferred embodiment the screen consists of a single 'unitary' layer, ie the lens facets as well as the underlying lens basis comprises a common matrix. According to a second preferred embodiment the screen comprises a first matrix and a second matrix, wherein the lens facets comprise the first matrix and the underlying lens basis comprises the second matrix, the latter typically as a continuous layer in the form of a sheet. The terms 'first and second matrix' are used to designate that each of the two matrices has at least one property that is not shared.

When it is described in the present application that a refractive diffusion material or a matrix material is distributed corresponding essentially to the lens facets as such, this means that also that part of the lens basis that is most proximate to the lens facets can contain the refractive material in a layer that is thin compared to the thickness of lens basis, ie less than 10 percent of the thickness of the base plate. This is typically due to the fact that often it is not technically possible to distribute the diffusion material only in the lens facts, but 'bridges' of diffusion material will almost always occur between the individual lens facets. Since a base plate has a typical thickness of 2–3 mm, this means that the bridges can have a thickness of about 0.2 mm. However, it will often be possible to reduce the thickness considerably, eg as to as little as 0.005 mm when lens basis in the form of a solid plate is pressed towards a fluid matrix distributed over the lens facets.

The screens corresponding to the present invention can be used in combination with other screens and therefore the first and second surfaces of the screen need not be free, but can be mounted on or in connection with other screen elements.

According to a second aspect of the invention various methods are provided for effective and simple manufacture of screens according to the invention.

The invention will now be explained in further detail with reference to the Figures, wherein FIG. 1 shows an explanatory configuration of a projection system consisting of an image source and a projection screen;

Figure 8A:
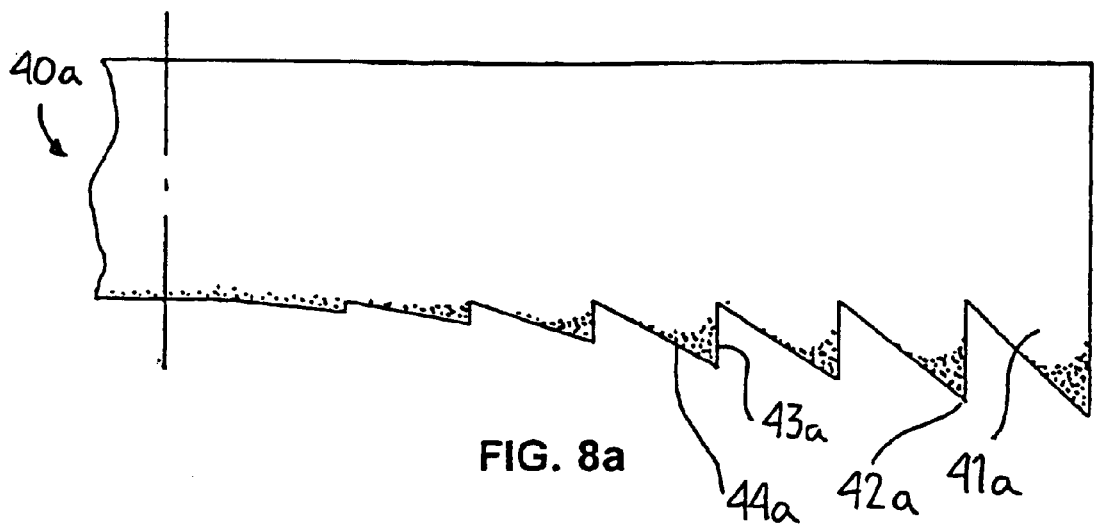
Figure 8B:
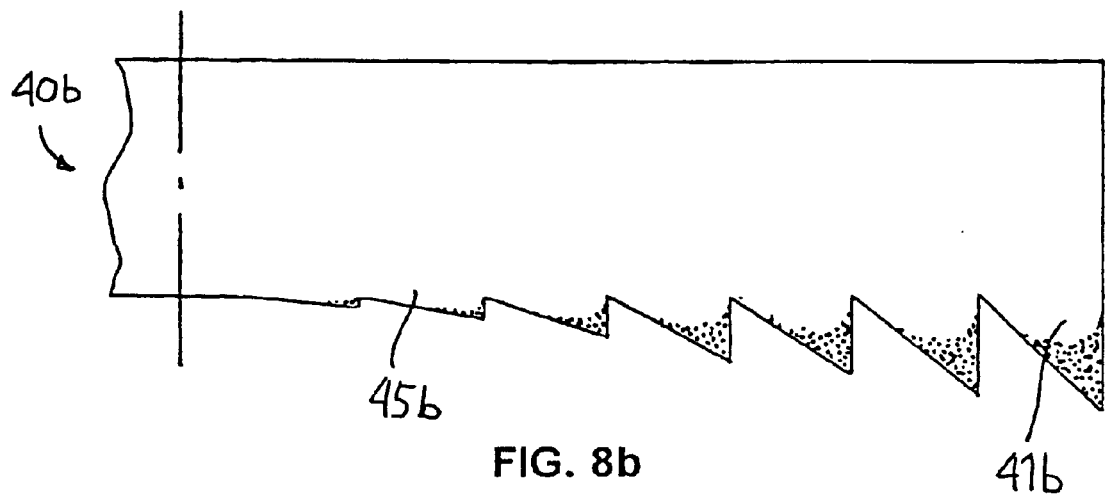
Figure 8C:
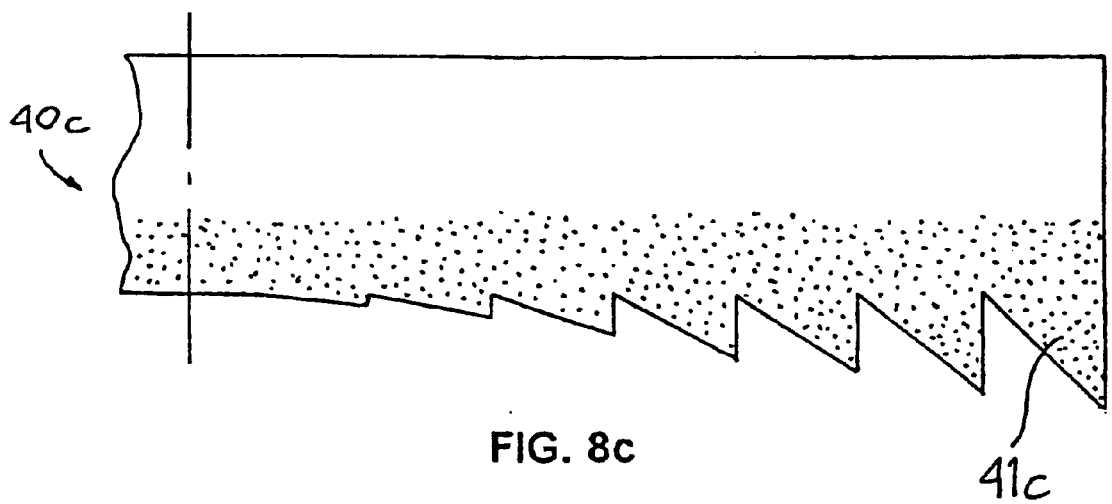
Figure 9A:
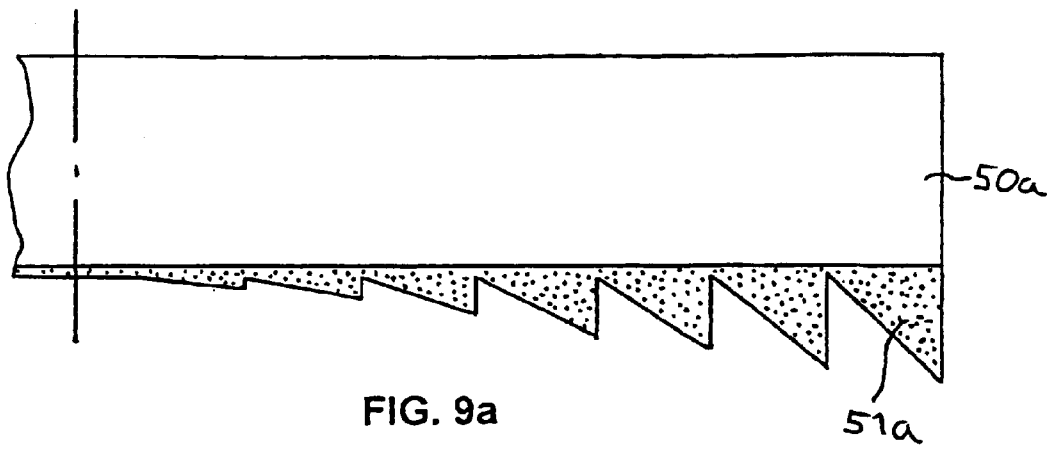
Figure 9B:
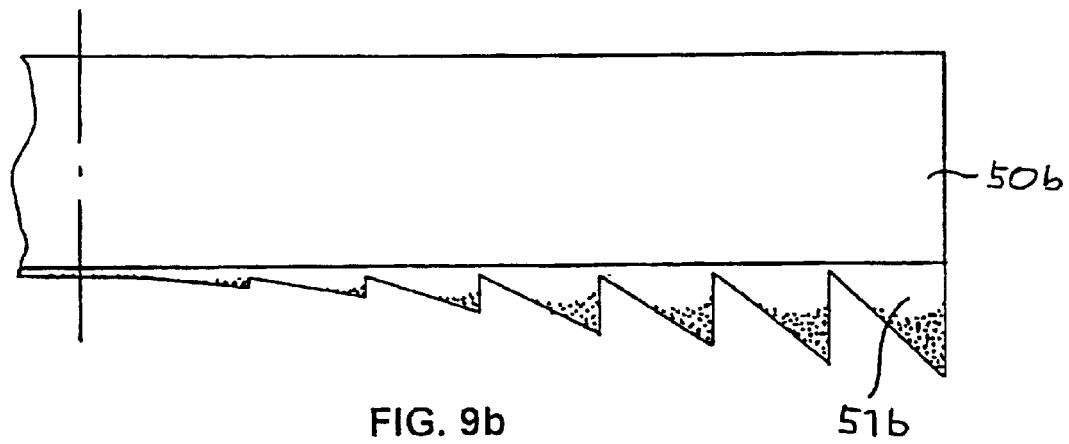
Figure 9C:
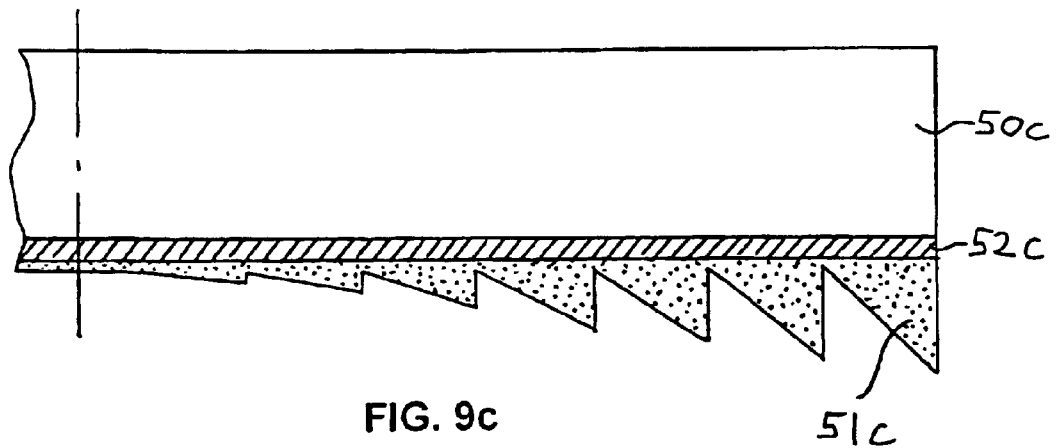

FIGS. 8a through c illustrate screens manufactured in a first method according to the invention; and FIGS. 9a through c illustrate screens manufactured in an alternative embodiment according to the invention.

Figure 1:
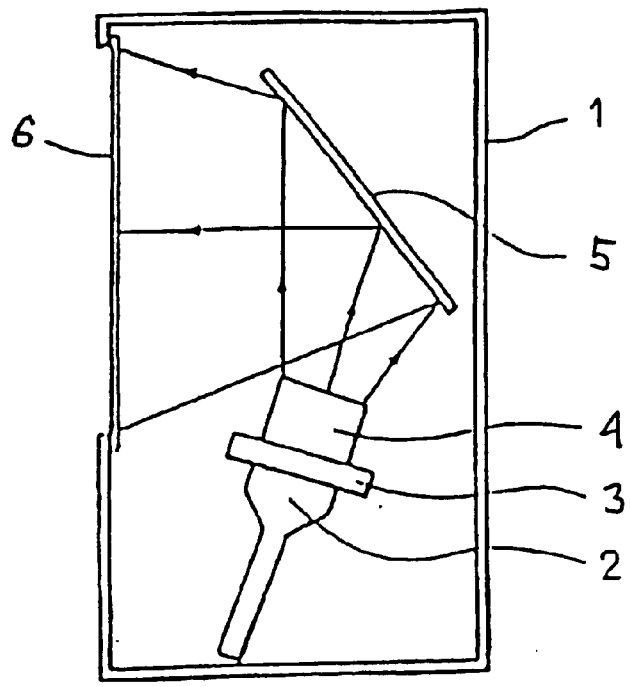
Figure 2:
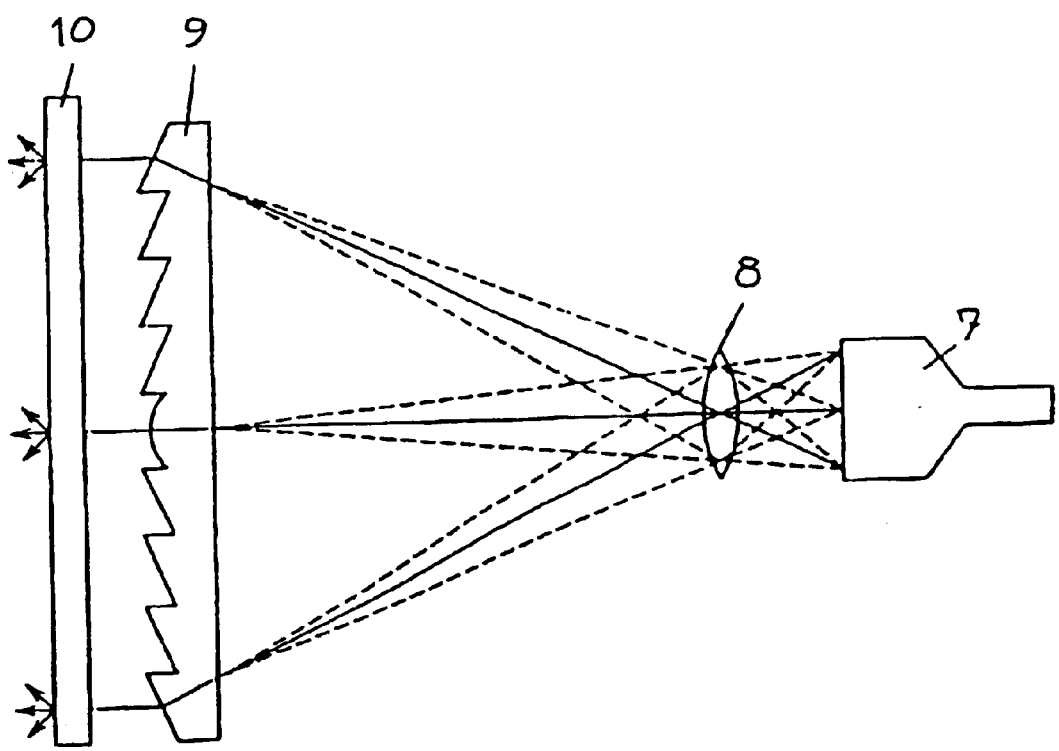
FIG. 2 is a sectional view through a projection apparatus.

Before the various preferred embodiments of the present invention are described, an explanation is given with reference to FIGS. 1 and 2 of the general configuration of the projection assembly of the type that uses a rear projection screen.

FIG. 1 is a sectional view of a basic configuration of a projection system with a rear projection screen wherein a light source 7 will, via a divergent lens 8, project an image towards a Fresnel lens 9 that deflects the diverging light beams such that they exit from the fresnel lens as a batch of parallel beams that are all 'normal' to the surface, following which the light is dispersed in the diffusion plate 10 and thereby made visible to a viewer. It should be noted that the diffusion screen could have a lens structure for diffusing the light.

As an example of a complete system, FIG. 2 shows a vertical section through a projection television set or a video projection apparatus. Such apparatus 1 can be constructed with three separate television tubes, one tube for each ground colour, or as outlined in FIG. 1 with one single image source 4 for reproduction of a colour image on the screen 6 via a mirror 5.

Figure 3:
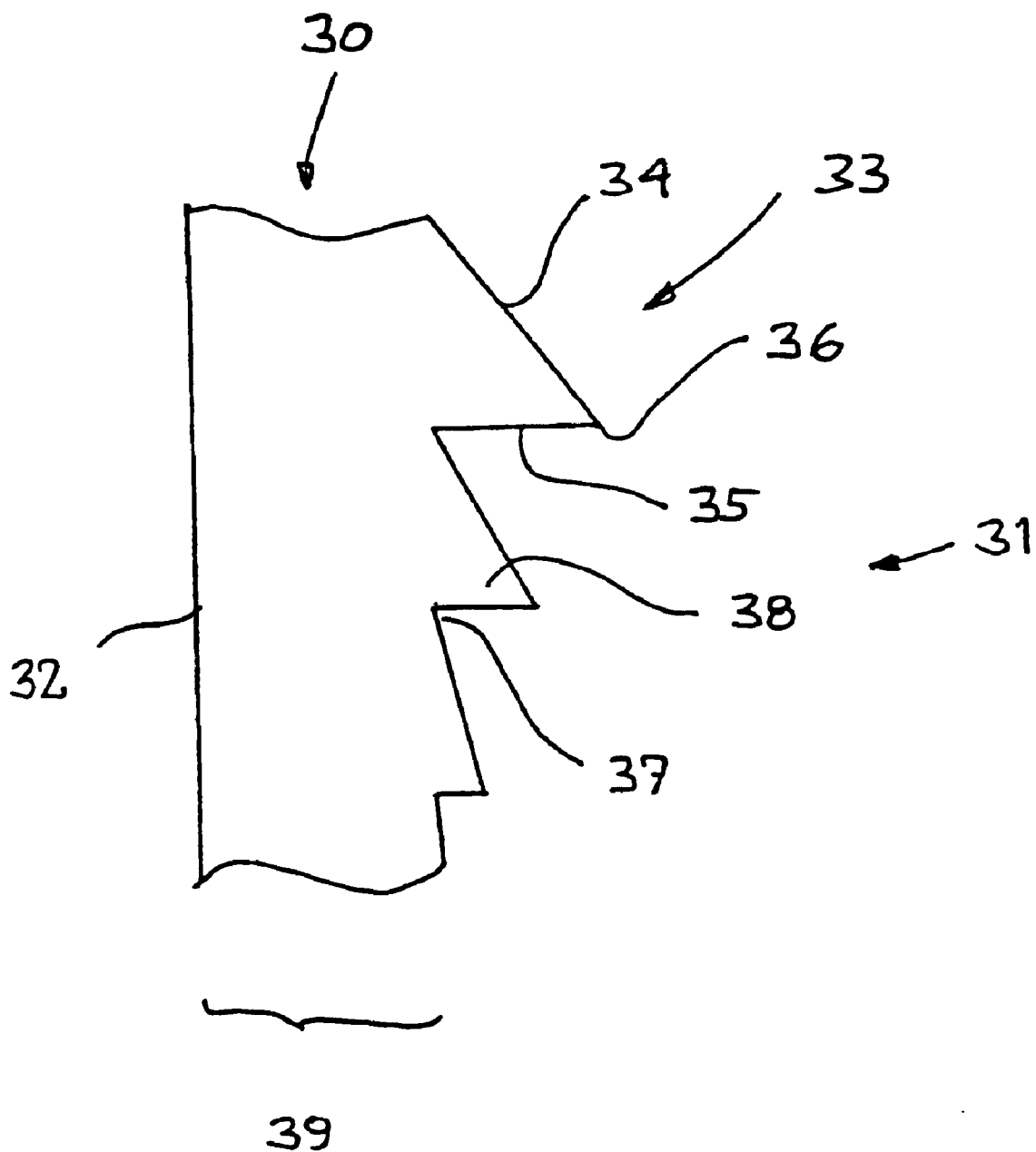
FIG. 3 shows the exemplary elements of a Fresnel lens.

With reference to FIG. 3 the explanatory structures and elements for a Fresnel lens will be explained and, likewise, the nomenclature that will be used in the following description of the preferred embodiments of the present invention will be established.

A Fresnel lens as it lends itself for use in this invention consists of a lens basis or merely a basis in the form of an approximately planar sheet element 30 with a first surface 31 and a second surface 32. The first surface comprises a number of faceT structures (also designated lens facets) 33 that combine to form a lens system in the form of a Fresnel lens, whereas the second surface in the embodiment shown is an approximately planar and smooth surface that defines the reference plane of the lens. However, the second surface can also carry a lens system, eg a lenticular lens system. Often the term Fresnel lens is used, or merely lens, to designate the entire system of a lens basis with facets. A Fresnel lens can be formed of either a number of linear, mutually parallel facet structures or a number of concentric, annular, in practice circular facet structures.

The individual facet structure consists of the actual facet 34, also designated a facet face, and a step face 35 that meet each other in a facet edge 36 corresponding to the facet tip. The step faces are often designated "Störflanken" or "riser facets". The area between two facet edges is designated a groove, and the deepest point in the groove is designated the groove bottom 37. The area that is delimited by a facet and a step face is designated a facet element 38 or a lens facet. The height of the step face perpendicular to the reference plane is also designated the height of the lens facet or the groove depth. The facets can be plane or curved, but since it is difficult to manufacture a well-defined curvature or a very small facet of typically between 0.05 and 0.35 mm, typically of 0.08 and 0.12 mm, it is desired that the facets are plane. The facets are most steep corresponding to the lens periphery where the facet can have an angle of typically 45° relative to the reference plane. Towards the middle area or centre of the lens, the inclination decreases continuously for the individual facets to become almost parallel with the reference plane. The different angles of the individual facets mean that both the height of the step face as well as the volume, of the individual facet elements decrease towards the middle portion or centre of the lens. The step faces can be perpendicular to the reference plane, but they can also have another orientation, as will be described below. The bottom of the individual grooves can be in approximately the same plane or in different planes, but for production technical considerations the distance from the groove bottoms to the reference plane will usually decrease towards the lens periphery.

The various elements of the screen, ie the facet elements and the plate itself, are made of one or more different materials (often designated a matrix) wherein a transparent refractive agent, typically in particulate form, can be distributed.

The volume or weight percent of the refractive agent can very well exceed the volume or weight percent of the individual basis material.

Figure 4:
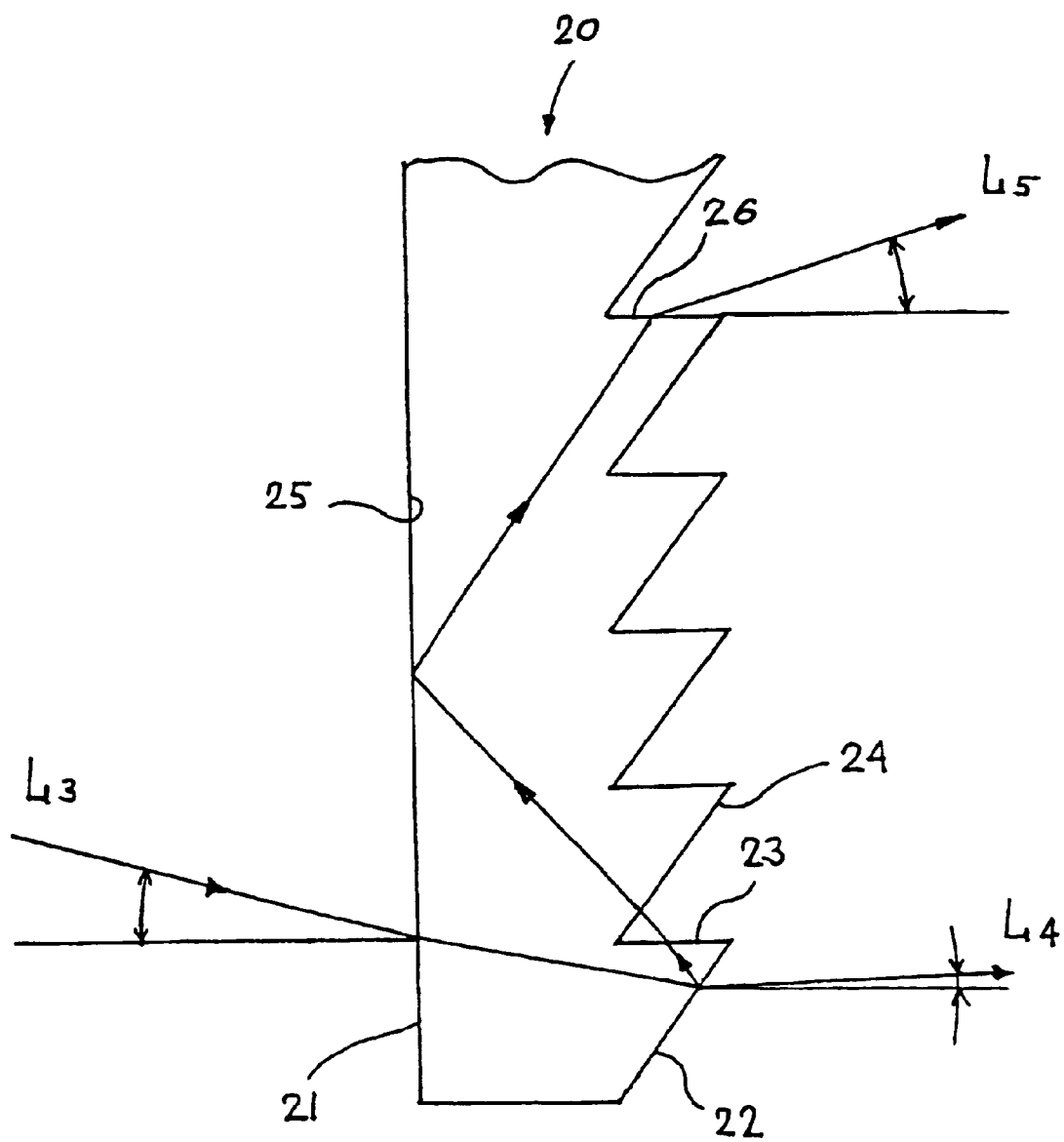
FIG. 4 is a sectional view through a first Fresnel lens to illustrate the transmission and reflection of a light beam.

FIG. 4 shows how a light beam L3 is transmitted through a clear Fresnel lens 20 with the facets facing away from the image source. The light beam enters the surface 21, is very slightly deflected following which it hits the active facet face 22 of the Fresnel lens where the beam is deflected to the direction L4. A part of the light beam is total-reflected from the facet face 22, following which it passes through the adjacent step face 23, the adjacent facet face 24 to be reflected from the rear 25 of the lens forwards and through the step face 26 and obtains an undesired deflection L5 that results in the above-described phenomena with formation of rainbows and double- and multiple-image formation. The shown light beam L3 with the deflected reflection L5 is only a single example since there are innumerable undesired light beams that will disturb the image, eg as double-image formation.

Figure 5:
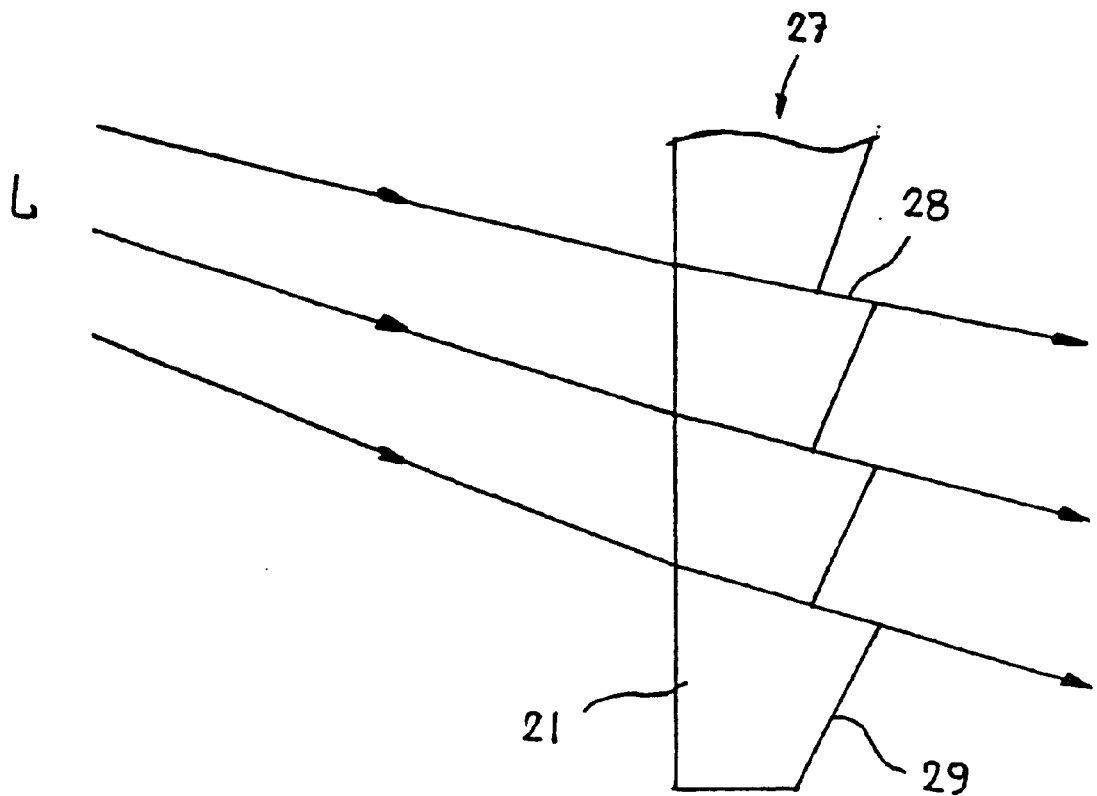
FIG. 5 is a sectional view through a second Frensel lens to illustrate the transmission of a light beam.

FIG. 5 shows an embodiment of a Fresnel lens 27 wherein the step faces 28 are configured such that they are parallel with the diverging light beams L from a light source arranged at a distance that is given for the screen, following deflection of these by the first passage through the surface 21. This counters primary reflection in the step faces, but does not influence the above-described reflection from the facet faces 29.

For that type of projection screens where the facets of the Fresnel lens faces rearwards towards the image source, the formation of rainbows and double- or multiple image formation occurs in a corresponding manner when those of the light beams that enter into the lens through the step faces are deflected.

Figure 6:
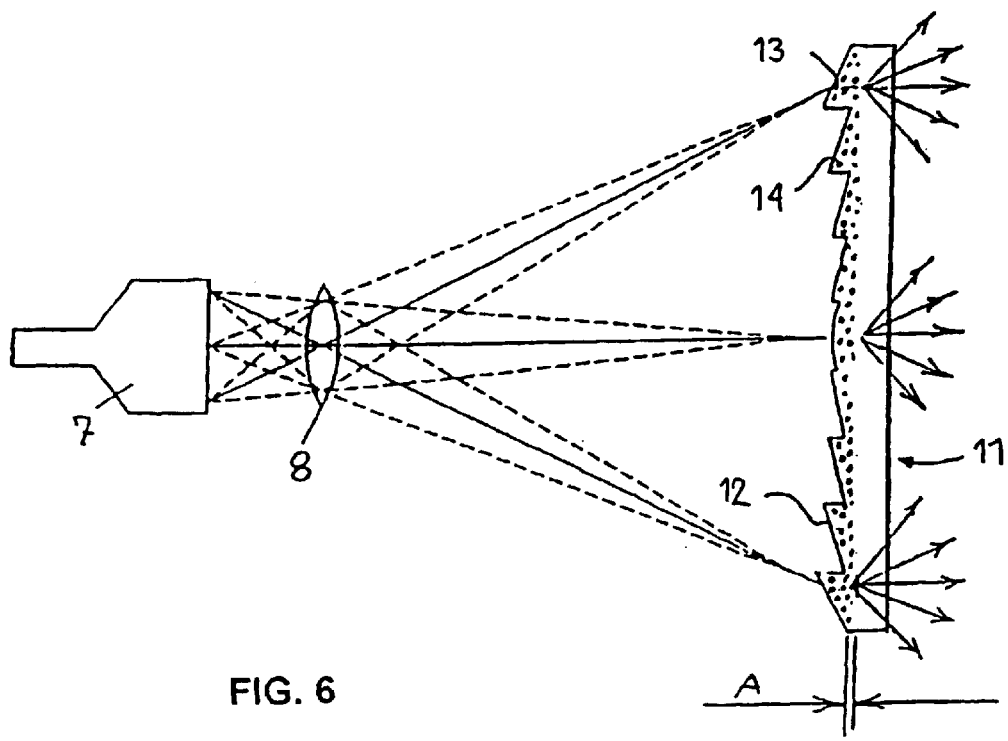
FIG. 6 is a sectional view through a projection screen according to the present invention illuminated by an image source.

FIG. 6 is a sectional view of an explanatory configuration of a projection system with a rear projection screen in the form of a Fresnel lens according to the present invention, and wherein a light source 7 will, via a divergent lens 8, project an image towards a Fresnel lens 11. It will appear from the figure that that side of the screen, or lens, that faces towards the image source has a Fresnel structure 12 to deflect light beams from the image source, such that the beams are deflected to become a batch of parallel beams with an orientation approximately perpendicular to the screen plane determined by the plane, forwardly oriented surface of this.

As will appear from the figure the facet elements of the Fresnel lens and that part of the screen that is most proximate to the facet elements contain a light-diffusing material 13. This light-diffusing material is, within the technical field that relates to projection screens, also designated a diffusion material or a mass spreader. In order to serve as light-diffusing agent the refraction index for the refractive agent must deviate from the refraction index for the material in which the refractive agent is situated. It will appear from the figure that the diffusion of the individual light beam will occur from the border face between that part of the lens that contains the light-diffusing material and that part of the lens that does not contain the light-diffusing material, but this is only to illustrate the principle behind the invention, however, since, of course, the diffusion of light will occur through the entire layer of light-diffusing material.

When the facet elements of the Fresnel lens and optionally that part of the screen that is most proximate to the facet elements contain a light-diffusing material in a thin layer, this will ensure adequate transmission of those of the light beams that are deflected in the facet faces with only little diffusion and thus ensuing good definition and contrast, whereas those of the light beams that are deflected in the step faces of the lens will be exposed to an increased diffusion and thus entail a considerable attenuation of the reflections that are responsible for the formation of shadow images.

The thickness of the layer that contains the light-diffusing material can be selected in accordance with the desired suppression of the double-image formation. For instance, the layer may have a thickness that completely or partially corresponds to the height of the step face of the facet elements, or the layer can be so thick that also a part of the lens base plate itself most proximate the facet elements will also contain a refractive material.

Depending on the method of manufacture for the lens, different refractive material can be used for the facet elements and the lens base plate, respectively, and, likewise, the density of the refractive material can be controlled as will be described below. If refractive material is used in the lens base plate, the thickness of the layer should be less than 50 percent of the thickness of the base plate, preferably less than 20 percent and most preferably less than 10 percent, but, even with a relatively thick layer of refractive material a distribution of this in accordance with the invention, ie most proximate to the facet elements, will result in an improved image with a higher degree of contrast and increased definition than in case the corresponding amount of refractive material was arranged in that part of the lens base plate that faces away from the facet elements as described eg in EP-A-0 859 270 discussed above, or throughout the entire lens screen as described in WO 99/53376 and also discussed above.

Figure 7:
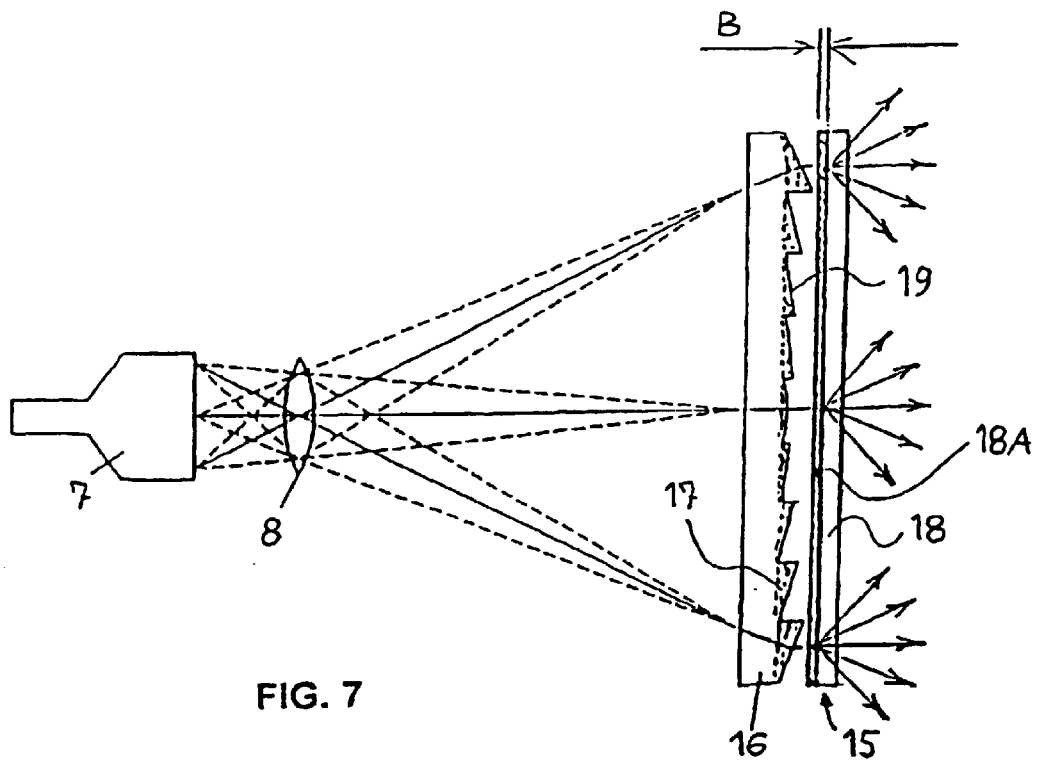
FIG. 7 is a sectional view through a projection screen corresponding to an alternative embodiment of the present invention.

An alternative embodiment of the invention is shown in FIG. 7 from which it will appear that the aggregate screen structure consists of two plane sheet elements arranged parallel in front of each other, wherein the sheet element 16 most proximate to the image source is provided with a Fresnel lens 19 on that side of the plate that faces away from the image source 7, and where the sheet element 15 that faces towards the viewer is provided with a light-diffusing coating or structure. It will appear from the figure that the refractive material is only located corresponding to the facet elements 17 such that the remaining portion of the Fresnel lens is clear. This is due to the fact that a part of the requisite refractive effect occurs in the image-generating element 15 that consists of a clear supporting element 18 with a diffusion layer 18A with the thickness B closest to the Fresnel lens. As discussed initially an increased light intensity is obtained in the corners when the Fresnel facets face away from the projector 7, but since about 6 percent of the light is also lost during transition to the element 15, the gain is poor, only about 5–10 percent.

Besides, tests have shown that the contrast is considerably improved in a screen corresponding to FIG. 6, since only that light in FIG. 4 that enters through screen element 18 is reflected from the Frensnel lens surface 19 towards the viewer.

In the following various preferred embodiments will be described for the manufacture of a screen comprising a Fresnel lens structure according to the present invention and the screens corresponding thereto. More specifically two different principles of manufacture will be described that aim towards manufacture of relatively large Fresnel lenses on a limited scale and manufacture of relatively small Fresnel lenses on a large scale, respectively.

Examples of the light-diffusing agent mentioned in the following include calcium carbonate, silicon oxide or glass beads having a typical average particle size of between 5 and 25 $\mu$m. Calcium carbonate is a very soft material and will therefore not harm the mould, and the same applies to glass beads that are approximately spherical. Glass beads, however, are associated with the drawback that they can be all-reflective. Silicon oxide has extremely good optical properties, but it is a crystalline material with sharp edges with an ensuing increased wear of the mould. The final choice of light-diffusing agent will entail a weighing of advantages and drawbacks for the selected method of manufacture and for the intended use of the lens.

According to the first method a closed mould for a Fresnel, lens is arranged approximately horizontally, such that the negative mould for the Fresnel pattern as such constitutes the bottom of the mould and thus faces upwards. The mould is then charged with a matrix in the form of a curable, fluid plastics material, eg PMMA or a mixture of PMMA and styrene or other suitable plastics materials with the desired optical and mechanical properties, with which a light-diffusing, translucent material has been admixed, typically in particulate form. Following charging of the mould with the fluid plastics material, it is allowed to rest until the light-diffusing material has precipitated towards the bottom of the mould, ie has sedimented corresponding to the facet elements. The refractive material will sediment with an approximately constant layer thickness throughout the entire bottom face of the mould, and it follows that depending on the amount of the refractive material the facet elements corresponding to the peripheral portion of the Fresnel lens where the facet elements are deepest—as discussed above—will be completely or partially filled with refractive material. Following sedimentation of the refractive material, the plastics material is cured—eg by application of heat—following which the ready lens can be discharged from the mould. Other methods of curing the plastics material could be by use of a two-component, auto-polymerising plastics material.

With the above as point of departure, it is possible to control the distribution of the light-diffusing material in the matrix by controlling the sedimentation rate and the curing process. Depending on the one hand on the selected light-diffusing material, and on the other of the viscous properties of the selected matrix, the light-diffusing material will sediment at a given rate. By initiating the hardening process at the point in time, where the desired distribution has been obtained, it will be possible to 'lock' the light-diffusing material in the matrix. Since most of the curing or polymerisation processes do not have a momentary course, but a somewhat protracted one, the light-diffusing material will, of course, move further downwards towards the facets, but they may, however, relatively quickly be braked as the matrix starts to cure or polymerise.

FIG. 8c is an example in which the light-diffusing material is locked corresponding to a distribution in about half of the thickness of the screen 40c that faces towards the facets 41c. This configuration ensures on the one hand a suppression of the double-image formation, on the other that a relatively thin image-generating layer is formed. As mentioned previously a thinner image-creating layer ensures a clearer image. FIG. 8a shows an example in which the light-diffusing material has sunk to bottom in the lens facets 41a whereby the light-diffusing material is concentrated where it has the maximum effect for suppressing the double-image formation, viz. corresponding to the tips 42a of the lens facets. As indicated in the figure, the light-diffusing material will typically sediment in such a manner that a relatively increased portion of the step faces 43 is covered by material compared to the facet faces 44a themselves, thereby ensuring, for a given amount of light-diffusing material, the best possible attenuation of the double-image formation.

It is noted that when the same amount of light-diffusing material sediments per area unit, the deep, peripheral facets will only be filled to a smaller extent. This can be compensated for by use of a combination of moulding in open and closed mould, such that a fluid matrix with a light-diffusing material is distributed primarily in the grooves whereby it is ensured that the deep facets receive a larger amount of light-diffusing material. The mould is subsequently closed and the screen mould as described above by use of a matrix with or without added light-diffusing material. Obviously the filling must occur at a point in time or in such a manner that the light-diffusing material filled into the facets is not flushed away. FIG. 8b shows an example of the latter method wherein it is noted that the deep, peripheral facets 41b contain a larger amount of light-diffusing material than the rather shallow, central facets 45b. If the matrix poured into the mould also contains a light-diffusing material, it will be possible to accomplish a screen that will be a combination of the subject-matter shown in FIGS. 8b and 8c and, likewise, it will be possible to use different light-diffusing materials.

Since the above-mentioned problem of double-image formation depends on both the inclination of the facet faces and the height of the step faces, the problem of double-image formation will increase with increased inclination of the individual lens facets, such that double image-formation increases with increasing radius. It is therefore convenient that the largest amount of material is found in the deepest facets.

Thus, the screens provided in accordance with the invention can now be used alone or combined with other screens (as shown in FIGS. 6 and 7, respectively), either by eg gluing or simple mechanical mounting corresponding to the rim portions of the screen.

According to the second preferred method, a mould for a Fresnel lens is arranged substantially horizontally, such that the negative mould for the Fresnel pattern as such constitutes the bottom of the mould and thus it faces upwards. Then a curable, relatively mobile plastics material is distributed in which a light-diffusing material has been admixed, typically in particulate form, such that it covers a large or small portion of the mould. In the next step of the method of manufacture, a plane plate is arranged on top of the mould and it is pressed downwards towards same whereby the mobile plastics material is distributed over the mould and thus fills it corresponding to the facet elements, whereby a thin layer of refractive material is formed immediately behind the facet elements in the ready Fresnel lens. The plane plate can be a clear plastics plate, a clear plastics plate coated with a coating containing a refractive material on that side, or it can be a plate that contains a refractive material throughout. Besides, the plate can contain or be coated with contrast-increasing materials, such as black-carbon, aniline colours, or a so called 'microlouver' layer, eg as marketed by 3M (Minnesota, USA) or Nitto Denko (Japan). Also, the plate can be coated with an anti-reflex coating on the side thereof that corresponds to its free surface. Following positioning of the plate, the plastics material is cured, eg by exposure to heat or UV-light applied through the plate, following which the finished lens can be removed from the mould.

FIG. 9a shows an example with a plate 50a wherein the light-diffusing material is locked corresponding to a distribution in the facets 51A immediately after the plastics material has been distributed in the fact grooves, and FIG. 9b shows an example in which the light-diffusing material has had opportunity to sediment in the facets 51b before it has been bound by the curing of the plastics material. FIG. 9c shows an example in which the plate 50c has been coated with a layer 52c that can either be a contrast-increasing coating or an image-generating material. The plate can also contain a further material, and likewise it can comprise a coating on only the other or both sides.

A lens manufactured in accordance with the first method will thus consist of only a single base material (or matrix), whereas a lens manufactured in accordance with the second method of manufacture can consist of two basis materials for plate and lens facets, respectively, or three base materials for plate, coating and lens facets, respectively. As described above the facets and the plate can contain different refractive materials, in particular the lens facets can consist of a material with a refractive index that is different from the material(s) of which the remainder of the screen consists.

If a refractive material can be used, it should have an approximately spherical shape without sharp edges to reduce wear of the mould.

It is noted that FIGS. 8a–c and 9a–c illustrate only the screens as such, and not the moulds necessary for their manufacture.

Typical dimensions for a Fresnel lens manufactured in accordance with the above-described methods will be a Fresnel structure with a groove width of between 0.05 and 0.18 mm, preferably between 0.08 and 0.12 mm, a plate with a total thickness of 2–3 mm and a coating, if present, of typically 0.1–0.3 mm. The deepest grooves on a 50–60 inch screen (measured diagonally) will typically be about 0.12 mm.

However, it is within the scope of the present invention that the final choice of dimensions and materials will entail a weighing of advantages and drawbacks of the chosen method of manufacture and for the intended use of the lens and hence the desired optical properties.

What is claimed is:

1. A translucent screen comprising a sheet element having a first surface and a second surface substantially parallel with the first surface, the first surface having a number of lens facets that combine to form a lens system for paralleling diverging light beams that enter into the sheet element from a surface, the sheet element comprising a matrix material having refractive particles located therein, a refractive index of the refractive particles differing from a refractive index of the matrix material in which the refractive particles are located, and the matrix material forming the first as well as the second surface of the sheet element, wherein the lens facets contain the refractive particles in a concentration that exceeds a concentration of refractive particles in that part of the sheet element that is located most proximate to the second surface.

2. A translucent screen according to claim 1, wherein that part of the sheet element that is outside the lens facets contains refractive particles in an even layer in that part of the sheet element that is most proximate to the lens facets, wherein said layer has a thickness that is no more than 50 percent of the total sheet element thickness, and wherein that part of the sheet element that is most proximate to the second surface contains substantially no refractive particles.

3. The translucent screen according to claim 2, wherein the layer has a thickness that is no more than 20 percent of the total sheet element thickness.

4. The translucent screen according to claim 2, wherein the layer has a thickness that is no more than 10 percent of the total sheet element thickness.

5. A translucent screen according to claim 1, wherein substantially only the lens facets contain refractive particles, and that part of the sheet element that is outside the lens facets contains substantially no refractive particles.

6. A translucent screen according to any one of claims 1–5, wherein the refractive particles are evenly distributed in each lens facet.

7. A translucent screen according to any one of claims 1–5, wherein the refractive particles are distributed in the lens facets with a highest concentration thereof being in tips of the lens facets.

8. A translucent screen comprising a sheet element having a first surface and a second surface substantially parallel with the first surface, the first surface having a number of lens facets that combine to form a lens system for paralleling diverging light beams that enter into the sheet element from a surface, the sheet element comprising first and second materials, the first material providing the first surface of the sheet element having the lens facets and having refractive particles located therein and being a matrix material, and the second material forming a coherent layer parallel with the plane of the lens facets and providing the second surface of the sheet element, wherein a refractive index of the refractive particles differs from a refractive index of the matrix material in which the refractive particles are located.

9. A translucent screen according to claim 8, wherein the refractive particles are evenly distributed in each lens facet.

10. A translucent screen according to claim 8, wherein the refractive particles are distributed in the lens facets with a highest concentration thereof being in tips of the lens facets.

11. A translucent screen according to any one of claims 8 through 10, wherein the second material constitutes an extruded plate.

12. A translucent screen according to claim 11, wherein the extruded plate is coated with or contains one or more materials selected from the group consisting of light-diffusing agents, light-absorbing agents and contrast-increasing agents.

13. The translucent screen according to claim 8, wherein substantially only the lens facets contain the first material.

14. A translucent screen according to claim 1 or 8, wherein the screen includes a second sheet element arranged parallel with said sheet element.

15. The translucent screen according to claim 14, wherein the second sheet element contains refractive particles.

16. A method of manufacturing a translucent screen having a sheet element with a first surface and a second surface substantially parallel with the first surface, the first surface having a number of lens facets that combine to form a lens system for paralleling diverging light beams that enter into the sheet element, the method comprising the steps of:
- providing a substantially closed mould with a negative relief of a lens system;
- positioning the mould substantially horizontally;
- providing a translucent, fluid and curable matrix material, with which is admixed a light-diffusing, granular agent with a refractive index different from the matrix material and with a density that exceeds that of the matrix material;
- charging the mould with the matrix material admixed with the light-diffusing granular agent;
- allowing the light-diffusing agent to sediment towards the negative relief of the mould, such that the concentration of the light-diffusing granular agent is higher in that part of the matrix material that is located most proximate to the negative relief of the mould;
- curing the matrix material; and
- removing the cured sheet element from the mould.

17. A method of manufacturing a translucent screen having a sheet element with a first surface and a second surface substantially parallel with the first surface, the first surface having a number of lens facets that combine to form a lens system for paralleling diverging light beams that enter into the sheet element, the method comprising the steps of:
- providing a substantially closable mould with a negative relief of a lens system;
- positioning the mould substantially horizontally;
- providing a translucent, fluid and curable first matrix material, with which is admixed a light-diffusing granular agent with a refractive index different from the matrix material and with a density that exceeds that of the matrix material;
- distributing the matrix material across the negative relief such that it is limited essentially to indentations of the relief;
- closing the mould;
- charging the mould with a second material that can be different from or identical with the first matrix material and wherein the second material can be admixed with a light-diffusing granular agent;
- allowing the light-diffusing granular agent to sediment towards the negative relief of the mould, such that the concentration of the light-diffusing granular agent is higher in that part of the first matrix material that is located most proximate to the negative relief of the mould;
- curing the first matrix material; and
- removing the cured sheet element from the mould.

18. A method of manufacturing a translucent screen having a sheet element with a first surface and a second surface substantially parallel with the first surface, the first surface having a number of lens facets that combine to form a lens system for paralleling diverging light beams that enter into the sheet element, the method comprising the steps of:
- providing a substantially closed mould with a negative relief of a lens system;
- positioning the mould with the negative relief facing upwards;
- providing a translucent, fluid and curable matrix material, with which is admixed a light-diffusing granular agent with a refractive index different from the matrix material;
- distributing the matrix material admixed with the light-diffusing granular material across the negative relief of the mould;
- providing a second material having a first surface and a second surface substantially parallel with the first surface;
- positioning the second material with the first surface towards the negative relief of the mould on which the matrix material admixed with the light-diffusing granular agent is distributed;
- pressing the second material downwards against the negative relief of the mould such that the matrix material admixed with the light-diffusing granular agent is distributed across the negative relief of the mould, and the second material essentially abuts the negative relief throughout the entire, first surface of the second material;
- curing the matrix material; and
- removing the cured sheet element from the mould.

19. A method of manufacturing a translucent screen according to claim 18, wherein the second material is coated with or comprises one or more materials selected from the group consisting of light-diffusing agents, light-absorbing agents and contrast-increasing agents.

20. A method of manufacturing a translucent screen according to claim 19, wherein the second material contains a light-diffusing agent.

* * * * *